__# 3,316,321
METHOD OF MANUFACTURING ALPHA-OLEFINS BY OLIGOMERIZATION

Helmut Hoegl and Goetz Rotta, Geneva, Switzerland, assignors to Compagnie Francaise de Raffinage, Paris, France
No Drawing. Filed Jan. 21, 1964, Ser. No. 340,123
Claims priority, application Switzerland, Jan. 22, 1963, 720/63
8 Claims. (Cl. 260—683.15)

This invention relates to a method of manufacturing alpha-olefins by oligomerization in the presence of a catalyst.

It is known to prepare alpha-olefinic oligomers with the aid of a catalyst, especially with the aid of organo-aluminous compounds, and more particularly with the aid of compounds of aluminum alkyl. Known methods comprise two phases, the first of which consists in adding an olefin to an aluminum alkyl compound, and the second in separating the long-chain hydrocarbon residues, thus obtained, from this compound and in removing these residues by a new addition of the olefin.

By oligomers are understood polymerization products of relatively limited chain length and having a number of carbon atoms not exceeding 50. The method according to the invention differs from known methods in that the catalyst consists of an aluminum alkyl compound and of an aromatic or aliphatic macro-molecular substance containing hydroxyl groups.

Thus the method according to the invention consists in using as a catalyst an alcoholate of a macro-molecular substance and of an aluminum alkyl compound, and traces of this aluminum alkyl compound not chemically bonded to said macro-molecular substance.

The invention generally concerns the method of manufacturing alpha-olefins by oligomerization of olefins, comprising carrying out the oligomerization by means of a catalyst consisting of an aluminum alkyl compound and at least one macro-molecular substance containing hydroxyl groups.

As an aluminum alkyl compound it is possible to use, for example, an aluminum trialkyl such as aluminum triethyl, aluminum tripropyl, etc.

As a macro-molecular substance, it is possible to use a primary, secondary or tertiary, aromatic or aliphatic alcohol polymer such as polyvinyl alcohol, a phenolic resin, etc. It is also possible to use a mixture of polymer substances. In certain cases it might be advantageous to use a support for the catalyst, especially when the macro-molecular substance is in the liquid phase. An organic or inorganic substance such as activated charcoal and aluminum oxide, for example, could be used as a support.

It should be noted that the reaction conditions, such as the presence of an inert solvent, the temperature, pressure and duration, are those of the known methods. Thus the temperature should be above 100° C. and the pressure below 100 atmospheres. As regards the duration, this obviously depends upon the above conditions.

The method according to the invention offers advantages over known methods, especially in facilitating the separation of the oligomers from the catalyst and in lending itself to continuous operation in proportion to the solid state of the catalyst.

The method may be put into operation, for example, in the following manner:

Example 1

The catalyst is prepared in a one litre autoclave by introducing, in a nitrogen atmosphere, 75 g. of pure, anhydrous polyvinyl alcohol and a solution of 21.5 g. of aluminum triethyl in 210 ml. of benzene. Ethylene is then introduced at a pressure of 40 atm. at ambient temperature, and heating is carried out at 150° C. After the pressure has dropped to 30 atmospheres, ethylene is re-introduced until a pressure of 50 atmospheres is obtained. This is done twice in succession.

When the reaction is terminated, the mixture is allowed to cool, the un-reacted ethylene is removed, and the reaction mixture is hydrolized with dilute sulphuric acid. This produces an organic benzene phase, in which the oligomerization products, which are substantially straight-chain alpha-olefins, are dissolved; 75% of these olefins have a chain length between $C_6$ and $C_{18}$.

Example 2

The following are mixed in an inert atmosphere in an outoclave as described in Example 1: 73 g. of pure and anhydrous polyvinyl alcohol, highly polymerized, 190 ml. of benzene, and a solution of 18.25 g. of aluminum triethyl in 20 ml. of benzene. Ethylene is then introduced at a pressure of 40 atmospheres at ambient temperature, the whole being slowly heated. Reaction begins at 125° C., and a pressure of 87 atmospheres is attained. Heating is again carried out at 140° C. Each time that the pressure drops to 30 atmospheres, 20 atphospheres of ethylene is added twice.

At the termination of the reaction, steps are taken as described under Example 1. The reaction product consists of a mixture of oligomers having chains between $C_6$ and $C_{50}$.

Example 3

The same quantities of catalyst constituents are introduced into an autoclave as are described in Example 2. The same quantities of ethylene are also introduced, but the reaction is carried out at a temperature of 150° C.

By proceeding as in Example 1, a mixture of oligomers having chains between $C_6$ and $C_{40}$ is obtained.

Example 4

The procedure is as in Example 1, except that the polyvinyl alcohol is replaced by 120 g. of phenolformol resin. 75% of the oligomers obtained have a chain length between $C_6$ and $C_{18}$.

Example 5

The procedure is as in Example 2, except that 25 g. of polyvinyl alcohol is replaced by 35 g. of phenolformol resin.

The reaction products obtained consist of a mixture of oligomers having chains between $C_6$ and $C_{50}$.

Example 6

The catalyst is prepared in a one litre autoclave by mixing, in a nitrogen atmosphere, 35 g. of polyvinyl alcohol polymerized to a low degree, a solution of 9 g. of aluminum triethyl in 210 ml. of benzene, and 100 g. of activated charcoal. Ethylene is introduced at 40 atmospheres. The procedure is as described in Example 1. The products obtained consist of oligomers, a large part of which have chains between $C_6$ and $C_{18}$.

In the above examples, the alpha-olefins are prepared by oligomerization of ethylene, but it is obvious that they could be prepared by oligomerization of other olefins such as propylene, butylenes, etc.

We claim:
1. In a method for the catalytic production of alpha-olefins by the oligomerization of olefins in an inert atmosphere, the steps which comprise introducing into said atmosphere a catalyst consisting of an aluminum alkyl compound and at least one macro-molecular substance which is a primary, secondary or tertiary aliphatic alcohol polymer, and thereafter introducing into said inert at- osphere containing said catalyst the said olefin for the oligomerization thereof.

2. A method as described in claim 1 in which a non-reactive solid substance is present for absorbing onto the surfaces of particles thereof the said catalyst for holding the said catalyst within the reaction zone while separating the oligomerization product therefrom.

3. A method as described in claim 2 in which the said non-reactive solid substance is selected from a group consisting of activated charcoal and aluminum oxide.

4. The method according to claim 1 characterized in that said aluminum alkyl compound is trialkyl aluminum.

5. The method according to claim 4, characterized in that said trialkyl aluminum is triethyl aluminum.

6. The method according to claim 1, in which the reaction temperature is maintained at a value about 100° C., and the pressure at a value below 100 atmospheres.

7. The method according to claim 1, in which, at the termination of the reaction, the un-reacted olefin is separated, and the oligomers are then separated from the catalyst.

8. The method of making alpha-olefins by oligomerization of ethylene, comprising: preparing a catalyst consisting of triethyl aluminum and polyvinyl alcohol by introducing on to this catalyst, ethylene at a pressure of 40 atmospheres at ambient temperature and then heating the reaction mixture to 150° C.; allowing the pressure to fall to 30 atmospheres and then re-introducing ethylene until the pressure reaches 50 atmospheres, allowing again the pressure to fall to 30 atmospheres, then re-introducing ethylene again until the pressure again reaches 50 atmospheres; and finally, after cooling, separating the un-reacted ethylene and the oligomers from the catalyst.

References Cited by the Examiner
UNITED STATES PATENTS

| | | | |
|---|---|---|---|
| 3,035,105 | 5/1962 | Hoffman | 260—683.15 |
| 3,069,403 | 12/1962 | Prapas | 252—431 |
| 3,168,588 | 2/1965 | White et al. | 260—683.15 |

DELBERT E. GANTZ, *Primary Examiner.*

R. H. SHUBERT, *Assistant Examiner.*